Feb. 19, 1946.                B. D. GILBERT                2,395,267
                              DRINKING GLASS
                            Filed March 20, 1942
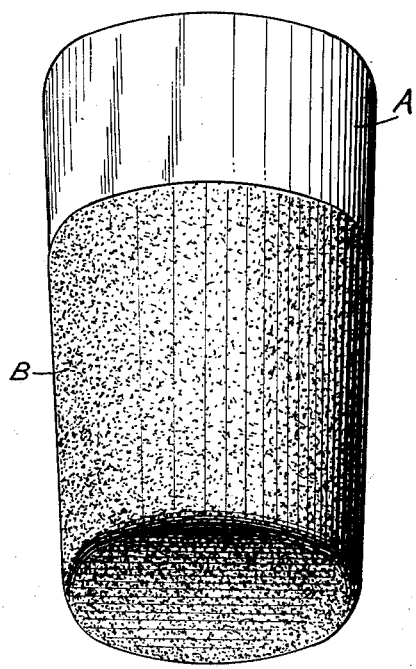
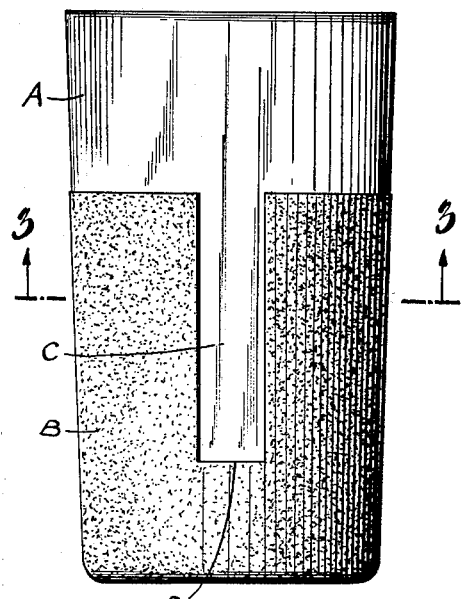
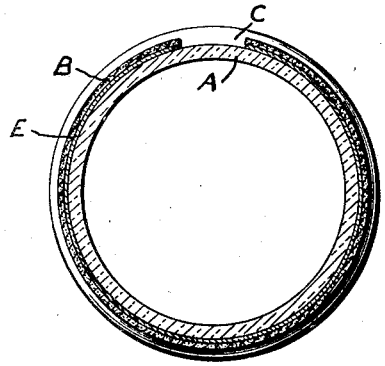
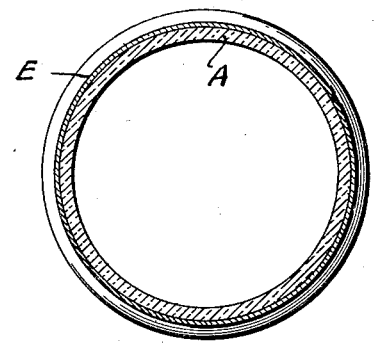
INVENTOR.
Benjamin D. Gilbert
BY
ATTORNEYS Patented Feb. 19, 1946

2,395,267

UNITED STATES PATENT OFFICE 2,395,267

DRINKING GLASS

Benjamin D. Gilbert, New York, N. Y.

Application March 20, 1942, Serial No. 435,586

3 Claims. (Cl. 65—66)

This invention relates to improvements in drinking glasses, and more specifically to a new drinking glass especially adapted for use with iced or cooled beverages.

An object of this invention is to provide a drinking glass having an integral external coating of heat-insulating material.

Another object of this invention is to provide a drinking glass having an external flocked coating adhesively attached thereto.

A further object of this invention is to provide a drinking glass with an external shock-absorbing and strengthening coating.

A still further object of this invention is to provide a drinking glass with an integral external "sweat"-proof coating.

These and other features of the invention will be best understood and appreciated from the following description of a preferred embodiment thereof, described for purposes of illustration and shown in the accompanying drawing, in which:

Fig. 1 is a rear perspective view of a drinking glass formed in accordance with the present invention;

Fig. 2 is a front view of the same glass showing further constructional details; and Fig. 3 is a cross-sectional view taken along the line 3—3 of Fig. 2.

Fig. 4 is a cross-sectional view similar to Fig. 3, illustrating a modified coated glass.

The invention, basically, consists in providing a drinking glass A with an external coating off flock B upon its sides and bottom. As can be seen in the drawing, the coating covers substantially the lower two thirds of the glass, this being sufficient to form a suitable holding surface for the glass when in use. The relative proportions of flocked area to total external area of the glass can, of course, vary as the size of the glass varies, it being necessary for the purposes of the present invention merely to provide a sufficient flocked surface so that the glass will be grasped at this surface, while at the same time the flock should preferably not extend up to the top rim of the glass where it would come in contact with the lips of the user.

In accordance with the preferred form of the invention, one side of the flock coating is formed with an aperture C, so that the contents of the glass may be viewed. While this aperture might extend to the bottom of the glass, in the embodiment of the invention illustrated I prefer to space the bottom D of the aperture C at a predetermined distance from the bottom of the glass so that the line D forming the bottom of the aperture may serve as an indicator to measure a predetermined amount of liquid within the glass. For example, the line D may be spaced from the bottom of the glass to such an amount that the liquid in the glass up to the level of the line D will measure one ounce, one ounce and a half or two ounces, as desired. This saves a separate measuring of liquid in the case of mixed beverages.

The flock may be applied in any manner known to those skilled in this art. In general, that portion of the glass which it is desired to flock is first covered with a suitable adhesive E, such as glue or cement, and the flock is then blown onto the adhesive.

It will be seen that the construction shown and described is extremely advantageous and useful. The provision of the flocked coating B eliminates external "sweating" of the glass and the necessity of using coasters, when the glass contains iced or cooled beverages. It also acts as an insulating medium for the hands of the holder of the glass. Additionally, the provision of an integral coating upon the glass acts as a shock absorber and structurally increases the strength of the glass as a whole. In case of hard shocks which are sufficient to break the glass the flock coating will prevent shattering of the glass into dangerous pieces.

I am aware of the use of so-called "jackets" for glasses, possessing some of the advantages of my construction, but such jackets cannot add to the structural strength of the glass nor will they prevent shattering of the glass in case of breakage. Additionally, it is structurally impossible to form such jackets with an aperture to view the contents of the glass, since such jackets must have a relatively tight fit all around if they are to stay on the glass and serve their purpose.

While the external coating illustrated in the preferred embodiment of my invention consists of flocking, it is to be understood that other suitable ground substances such, for example, as cork might be used.

A further modified form of invention is illustrated in Fig. 4, showing the external coating being formed by an adhesive alone, which will form a decorative, heat-insulating layer, and also increases the strength of the glass. This form of the invention may be used with or without the sighting aperture.

Additionally, while the aperture illustrated is of regular, substantially rectangular shape, it is to be understood that for the purposes of this invention it may have any other suitable shape; for example, it is contemplated that the aperture may be in the form of some special generally vertical design which would add to the attractiveness of the glass as a whole.

Accordingly, while I have herein described one specific embodiment of my invention, it is to be understood that, in the broad sense, my invention is not limited thereto, but only as may be required by the following claims.

I claim:

1. As a new article of manufacture, a drinking glass having an exterior coating of flocking adhesively attached to the bottom and on a substantial portion of the sides, the flocking on the sides being formed with an aperture descending from the top border of the flock to a point a predetermined distance from the bottom of the glass.

2. The article according to claim 1, in which the distance from the bottom of the glass to the bottom of the aperture is a measure of a predetermined quantity of liquid within the glass, whereby the lower part of said glass up to the bottom of said aperture may be used as liquid measuring device.

3. As a new article of manufacture, a drinking glass having an exterior coating of flocking adhesively attached to the bottom and on a substantial portion of the sides but terminating a predetermined distance from the top of the glass, the flocking on the sides being formed with an aperture descending from the top border of the flock to a point a predetermined distance from the bottom of the glass.

BENJAMIN D. GILBERT.